United States Patent
Moriyama et al.

(10) Patent No.: US 12,361,458 B2
(45) Date of Patent: Jul. 15, 2025

(54) RENTAL FEE CALCULATION DEVICE, RENTAL FEE CALCULATION METHOD, AND RENTAL FEE CALCULATION PROGRAM

(71) Applicant: HONDA MOTOR CO., LTD., Tokyo (JP)

(72) Inventors: Hiroshi Moriyama, Tokyo (JP); Kentaro Sugimura, Saitama (JP); Michiyo Inoue, Tokyo (JP); Kotaro Nakamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/278,547

(22) PCT Filed: Feb. 26, 2021

(86) PCT No.: PCT/JP2021/007521
§ 371 (c)(1),
(2) Date: Aug. 23, 2023

(87) PCT Pub. No.: WO2022/180836
PCT Pub. Date: Sep. 1, 2022

(65) Prior Publication Data
US 2024/0144330 A1 May 2, 2024

(51) Int. Cl.
*G06Q 30/0283* (2023.01)
*G06Q 30/0645* (2023.01)

(52) U.S. Cl.
CPC ..... *G06Q 30/0284* (2013.01); *G06Q 30/0645* (2013.01)

(58) Field of Classification Search
CPC ............. G06Q 30/0284; G06Q 30/0645
See application file for complete search history.

(56) References Cited

U.S. PATENT DOCUMENTS

2014/0277844 A1 9/2014 Luke
2014/0279576 A1 9/2014 Luke
(Continued)

FOREIGN PATENT DOCUMENTS

JP 2003-288539 A 10/2003
JP 2016-521389 A 7/2016
(Continued)

OTHER PUBLICATIONS

Jonathan D. Adler, Online routing and battery reservations for electric vehicles with swappable batteries, 2014, p. 285-290 (Year: 2014).*

(Continued)

*Primary Examiner* — Ibrahim N El-Bathy
(74) *Attorney, Agent, or Firm* — Paratus Law Group, PLLC

(57) ABSTRACT

A rental fee calculation device for calculating a rental fee for renting a battery to be rented when the battery is rented to a user via a battery storage apparatus configured to allow the battery to be attached and detached includes: a first fee calculation unit configured to calculate a first fee based on a rental period from when the battery is removed from the battery storage apparatus to when the battery is returned; a second fee calculation unit configured to calculate a second fee based on a used power amount discharged by the battery during the rental period; a rental fee calculation unit configured to calculate the rental fee based on the first fee and the second fee; and an input and output unit functioning as an output unit configured to output rental fee information indicating the calculated rental fee.

9 Claims, 6 Drawing Sheets

(56) References Cited

U.S. PATENT DOCUMENTS

| | | | |
|---|---|---|---|
| 2016/0180632 A1* | 6/2016 | Santana | G07F 9/006 700/238 |
| 2017/0053459 A9 | 2/2017 | Luke | |
| 2018/0217210 A1 | 8/2018 | Kuniya | |
| 2021/0091439 A1* | 3/2021 | Reeves | G06Q 30/0283 |
| 2021/0150378 A1* | 5/2021 | Wang | G06N 5/025 |
| 2021/0192645 A1 | 6/2021 | Kawamura et al. | |
| 2021/0350428 A1* | 11/2021 | Woo | G06Q 30/0284 |

FOREIGN PATENT DOCUMENTS

| | | |
|---|---|---|
| JP | 2016-171661 A | 9/2016 |
| JP | 2019-066977 A | 4/2019 |
| KR | 10-2011-0043114 A | 4/2011 |
| WO | WO 2019/181659 A1 | 9/2019 |
| WO | WO 2020/027196 A1 | 2/2020 |

OTHER PUBLICATIONS

Jun. 1, 2021, translation of International Search Opinion issued for related PCT Application No. PCT/JP2021/007521.
Jun. 1, 2021, Translation of International Search Report issued for related PCT Application No. PCT/JP2021/007521.

* cited by examiner

FIG. 2

| USER ID | CONTACT DETAILS | RENTAL LIMIT NUMBER |
|---|---|---|
| U001 | ○○○ | 2 |
| U002 | △△△ | 1 |
| U003 | □□□ | 3 |
| ⋮ | ⋮ | ⋮ |

FIG. 3

| BATTERY ID | CURRENT STATEID |
|---|---|
| B001 | BEING RENTED TO U001 |
| B002 | BEING RENTED TO U001 |
| B003 | BEING HOUSED IN FIRST HOUSING SPACE OF X001 |
| ⋮ | ⋮ |
| B013 | BEING RENTED TO U003 |
| ⋮ | ⋮ |

| DATE AND TIME | EVENT |
|---|---|
| 7:00 PM ON AUGUST 1 | REMOVE FROM X001 AND POWER AMOUNT AT TIME OF REMOVAL IS 1000 Wh |
| 8:00 PM ON AUGUST 1 | START DISCHARGING TO LOAD |
| 10:00 PM ON AUGUST 1 | DISCHARGING TO LOAD ENDS |
| 12:00 PM ON AUGUST 1 | RETURN TO X001 AND POWER AMOUNT AT TIME OF RETURN IS 500 Wh |

THANK YOU FOR YOUR USE.
      RENTAL FEES ARE AS FOLLOWS.
   PLEASE SETTLE BY HOLDING THE TERMINAL.

FEE BASED ON RENTAL PERIOD      : 500 YEN
                                 (DETAILS: 5 h OF RENTAL PERIOD × 100 YEN/h)
FEE BASED ON USED POWER AMOUNT : 500 YEN
                                 (DETAILS: 500 Wh OF USED POWER AMOUNT × 1 YEN/Wh)

RENTAL FEE: 1000 YEN

THERE IS AN IDLE PERIOD OF 3 h DURING THE RENTAL PERIOD.
THE RENTAL FEE ALSO INCLUDES A FEE OF 300 YEN BASED ON THIS IDLE PERIOD.
```

RENTAL FEE CALCULATION DEVICE, RENTAL FEE CALCULATION METHOD, AND RENTAL FEE CALCULATION PROGRAM

CROSS REFERENCE TO PRIOR APPLICATION

This application is a National Stage Patent Application of PCT International Patent Application No. PCT/JP2021/007521 (filed on Feb. 26, 2021) under 35 U.S.C. § 371, which is hereby incorporated by reference in its entirety.

TECHNICAL FIELD

The present invention relates to a rental fee calculation device, a rental fee calculation method, and a rental fee calculation program.

BACKGROUND ART

Patent Literature 1 discloses a server device which provides a service in which a battery, which is detachably mounted on a moving body which is movable using power, is shared by a plurality of users, the server device including: an acquisition unit configured to acquire information related to a power consumption rate for each of the users when the battery is used by each of the plurality of users; and a calculation unit configured to calculate an improvement result in the power consumption rate on the basis of the power consumption rate for the plurality of users acquired by the acquisition unit.

CITATION LIST

Patent Literature

Patent Literature 1: WO2020/027196

SUMMARY OF INVENTION

Technical Problem

However, in the related art, there is room for improvement from a viewpoint of improving an operation rate of a battery to be rented by prompting an early return of the battery to allow many users to use the battery efficiently.

The present invention provides a rental fee calculation device, a rental fee calculation method, and a rental fee calculation program capable of improving an operation rate of a battery by prompting an early return of the battery to be rented and by causing many users to use the battery efficiently.

Solution to Problem

A first invention is a rental fee calculation device for calculating a rental fee for renting a battery to be rented when the battery is rented to a user via a battery storage apparatus configured to allow the battery to be attached and detached, the rental fee calculation device including:
- a first fee calculation unit configured to calculate a first fee based on a rental period from when the battery is removed from the battery storage apparatus to when the battery is returned to the battery storage apparatus;
- a second fee calculation unit configured to calculate a second fee based on a used power amount discharged by the battery during the rental period;
- a rental fee calculation unit configured to calculate the rental fee based on the first fee calculated by the first fee calculation unit and the second fee calculated by the second fee calculation unit; and
- an output unit configured to output rental fee information indicating the rental fee calculated by the rental fee calculation unit.

A second invention is a rental fee calculation method, in which:
a computer configured to calculate a rental fee for renting a battery to be rented when the battery is rented to a user via a battery storage apparatus configured to allow the battery to be attached and detached is configured to execute processes of:
- calculating a first fee based on a rental period from when the battery is removed from the battery storage apparatus to when the battery is returned to the battery storage apparatus;
- calculating a second fee based on a used power amount discharged by the battery during the rental period;
- calculating the rental fee based on the first fee and the second fee which are calculated; and
- outputting rental fee information indicating the rental fee which is calculated.

A third invention is a rental fee calculation program for causing a computer configured to calculate a rental fee for renting a battery to be rented when the battery is rented to a user via a battery storage apparatus configured to allow the battery to be attached and detached to execute processes of:
- calculating a first fee based on a rental period from when the battery is removed from the battery storage apparatus to when the battery is returned to the battery storage apparatus;
- calculating a second fee based on a used power amount discharged by the battery during the rental period;
- calculating the rental fee based on the first fee and the second fee which are calculated; and
- outputting rental fee information indicating the rental fee which is calculated.

Advantageous Effects of Invention

According to the present invention, a rental fee calculation device, a rental fee calculation method, and a rental fee calculation program capable of improving an operation rate of a battery by prompting an early return of the battery to be rented and by causing many users to use the battery efficiently can be provided.

BRIEF DESCRIPTION OF DRAWINGS

FIG. 2 is a diagram illustrating an example of an authorized user DB stored in a storage unit of the rental fee calculation device.

FIG. 3 is a diagram illustrating an example of a battery DB stored in the storage unit of the rental fee calculation device.

FIG. 9 is a diagram illustrating an example of a rental fee information display screen displayed by a display unit of a battery storage apparatus.

DESCRIPTION OF EMBODIMENTS

Embodiments of a rental fee calculation device, a rental fee calculation method, and a rental fee calculation program of the present invention will be described below with reference to the accompanying drawings. First, background circumstances to which the present invention is applied will be described.

As electrification of various devices is progressing from a viewpoint of preventing environmental pollution, regarding batteries of bicycles, mobile phones, and the like, each company is conceiving a system in which a battery storage apparatus (battery station) for storing batteries is installed in a street and the batteries are shared (commonly used) among many users. In order to effectively utilize this system, it is important that a battery which can be rented to a user is present in the battery storage apparatus and it is important to improve an operation rate of the battery by causing many users to use the battery efficiently.

However, for example, a situation may arise in which a user does not return the battery at a return time promised at the time of rental. If there is no such a promise of the return time, a situation may arise in which a user holds a battery for an excessively long period of time without returning the battery. If this situation occurs, the number of unreturned batteries increases, and when a user wants to rent a battery, there may be a situation in which no battery which can be rented is present in the battery storage apparatus.

In order to avoid the situation in which no battery which can be rented is present in the battery storage apparatus when a user wants to rent a battery, it is important to collect the battery from the user who rents the battery as soon as possible. In other words, there is a demand to prompt the user to return the battery early.

Therefore, in the rental fee calculation device, the rental fee calculation method, and the rental fee calculation program according to the embodiments of the present invention, a rental fee of a battery is calculated on a basis of a first fee based on a rental period of the battery and a second fee based on a used power amount of the battery. Accordingly, it is possible to prevent a situation in which no battery which can be rented is present in the battery storage apparatus when a user wants to rent the battery from occurring by prompting an early return of a battery to be rented, and to improve an operation rate of the battery by causing many users to use the battery efficiently. An example of the rental fee calculation system to which the rental fee calculation device according to the embodiment of the present invention is applied will be described below.

[Rental Fee Calculation System]

Figure 1:
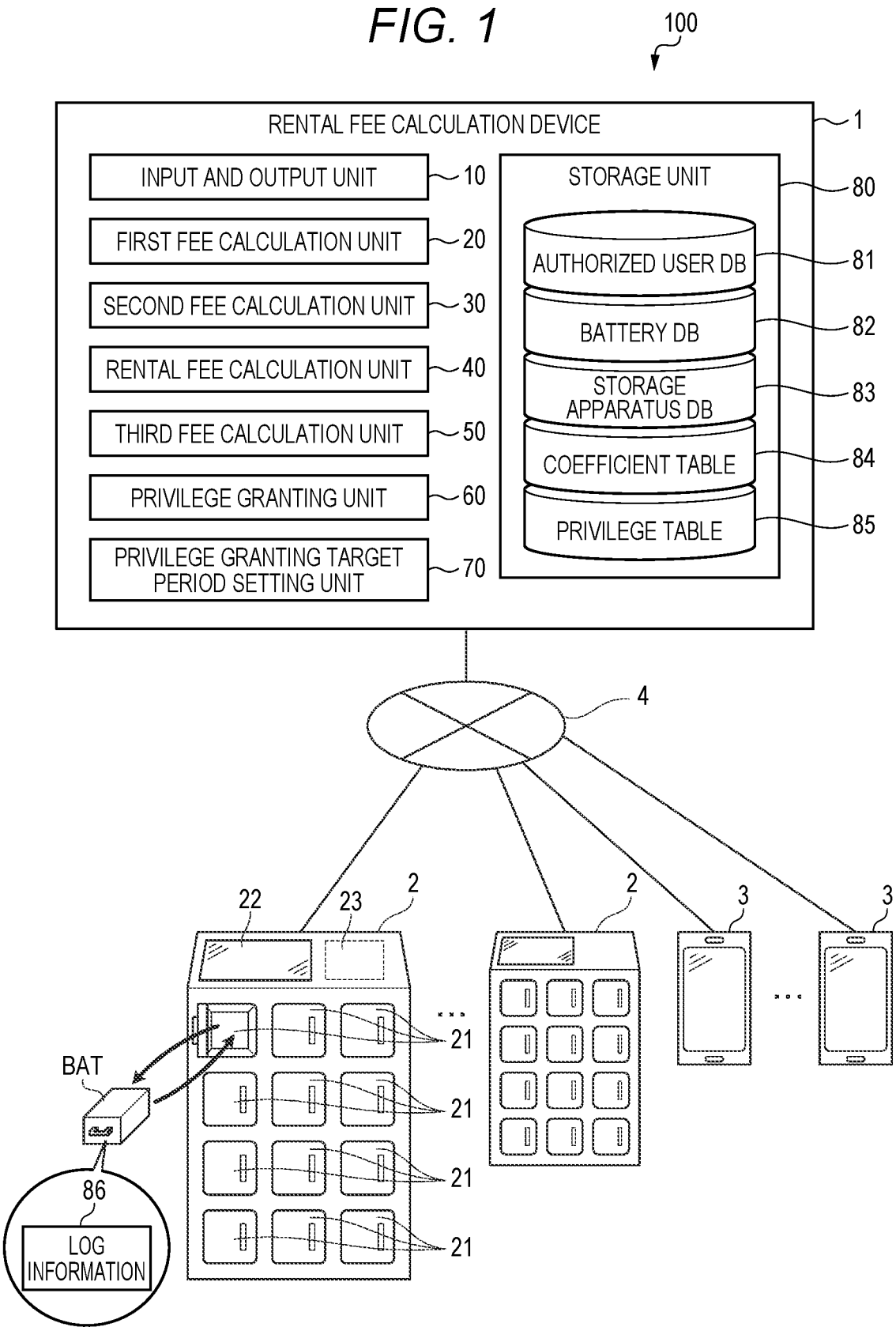
FIG. 1 is a diagram illustrating an example of a system configuration of a rental fee calculation system including a rental fee calculation device according to the present embodiment.

As illustrated in FIG. 1, a rental fee calculation system 100 includes a rental fee calculation device 1 according to an embodiment of the present invention and a plurality of battery storage apparatuses 2. In the rental fee calculation system 100, the rental fee calculation device 1 and the plurality of battery storage apparatuses 2 are communicably connected via a network 4 such as the Internet. The rental fee calculation system 100 is a system in which under control of the rental fee calculation device 1, a rental fee of a battery rented to a user via the battery storage apparatus 2 is calculated, thereby prompting the user to return the battery early and effectively utilizing the battery. In the rental fee calculation system 100, the rental fee calculation device 1 may be connected to a plurality of terminals 3 via the network 4 to be able to communicate with each other.

[Battery Storage Apparatus]

The plurality of battery storage apparatuses 2 are provided at any places, respectively, and are configured to allow batteries BAT to be rented to be attached and detached. Each of the batteries BAT is a power storage device which functions as a power source removed from the battery storage apparatus 2 and attached to an electric device to drive the electric device. The battery BAT is, for example, a secondary battery such as a lithium ion battery or a nickel-metal hydride battery.

For example, the battery storage apparatus 2 includes a plurality of housing spaces 21 each capable of housing one battery BAT. As an example, in the present embodiment, as illustrated in FIG. 1, the battery storage apparatus 2 has twelve housing spaces 21, and identification numbers 1 to 12 are assigned in order from the housing space 21 in an upper left row to the housing space 21 in a lower right row.

Each housing space 21 includes a door with a lock mechanism which can be closed while the battery BAT is housed. The door of each the housing space 21 is generally locked by the lock mechanism, and is opened under control of the battery storage apparatus 2 only when the rental fee calculation device 1 permits the battery BAT to be rented (described later). That is, the battery BAT can be removed from the battery storage apparatus 2 only when the rental fee calculation device 1 permits the battery BAT to be rented.

Each the housing space 21 includes a terminal (not illustrated) electrically connected to the battery BAT housed therein. The battery storage apparatus 2 can charge the battery BAT housed in each the housing space 21 and communicate with a control IC of the battery BAT (hereinafter, also referred to as battery IC) housed in each the housing space 21 via the terminal of each the housing space 21. The battery storage apparatus 2 can communicate with the battery IC to acquire, from the battery IC, identification information of the battery BAT (for example, a battery ID described later), information such as output voltage and remaining capacity (hereinafter, also referred to as battery information), log information 86 described later, and the like. The battery storage apparatus 2 may transmit the information acquired from the battery IC to a predetermined destination (for example, the rental fee calculation device 1).

Further, the battery storage apparatus 2 includes a display unit 22 for displaying various kinds of information to a user who wants to use the battery BAT, and a communication unit 23 for communicating with the terminal 3 of the user by short-range wireless communication or the like. As an example, the display unit 22 is a liquid crystal display, and the communication unit 23 is a near field communication (NFC) reader.

The terminal 3 is an electronic device including a storage device (storage medium) which stores user identification information (for example, a user ID described later), and is, for example, a smartphone. The terminal 3 also includes, for example, a display unit (such as a liquid crystal display) which displays various kinds of information to the user, and an input device (such as a touch panel) which receives user operations. The terminal 3 may be provided to be able to communicate with the battery storage apparatus 2 via the network 4, or may be provided to be able to communicate with the battery storage apparatus 2 by the short-range wireless communication such as RFID without the network 4. The terminal 3 is not limited to a smartphone, and may be an IC card or the like.

[Rental Fee Calculation Device]

The rental fee calculation device 1 is a server device (computer) including, for example, a processor, a storage device such as a memory or a hard disk, and an interface (none of which is illustrated) which controls input and output of data between the inside and the outside of the rental fee calculation device 1. An example of the rental fee calculation device 1 is a server device which can communicate with the battery storage apparatus 2, but the present invention is not limited thereto. For example, the rental fee calculation device 1 may be provided integrally with the battery storage apparatus 2.

The rental fee calculation device 1 includes an input and output unit 10, a first fee calculation unit 20, a second fee calculation unit 30, a rental fee calculation unit 40, a third fee calculation unit 50, a privilege granting unit 60, a privilege granting target period setting unit 70, and a storage unit 80.

[Each of Functional Units Included in Battery Rental Management Device]

The input and output unit 10 outputs various kinds of information to the battery storage apparatus 2 and the terminal 3 via the network 4 and receives various kinds of information from the battery storage apparatus 2 and the terminal 3. For example, the input and output unit 10 can function as an output unit which outputs rental fee information indicating a rental fee calculated by the rental fee calculation unit 40 described later and third fee information indicating a third fee calculated by the third fee calculation unit 50.

The first fee calculation unit 20 calculates a first fee based on a rental period from when the battery BAT is removed from the battery storage apparatus 2 to when the battery BAT is returned to the battery storage apparatus 2. For example, the first fee calculation unit 20 calculates the first fee by multiplying the rental period by a first coefficient stored in a coefficient table 84. A specific calculation example of the first fee including the first coefficient will be described later.

The second fee calculation unit 30 calculates a second fee based on a used power amount discharged by the battery BAT during the rental period. For example, the second fee calculation unit 30 calculates the second fee by multiplying the used power amount by a second coefficient stored in the coefficient table 84. A specific calculation example of the second fee including the second coefficient will be described later.

The rental fee calculation unit 40 calculates the rental fee based on the first fee calculated by the first fee calculation unit 20 and the second fee calculated by the second fee calculation unit 30. For example, the rental fee calculation unit 40 calculates the rental fee by adding up the first fee and the second fee. A specific calculation example of the rental fee will be described later.

The third fee calculation unit 50 calculates the third fee based on at least one idle period of a first idle period from when the battery BAT is removed from the battery storage apparatus 2 to when a load is first charged, and the second idle period from when the load is last charged before the battery BAT is returned to the battery storage apparatus 2 to when the battery BAT is returned to the battery storage apparatus 2. For example, the third fee calculation unit 50 calculates the third fee by multiplying the first coefficient stored in the coefficient table 84 by a sum of the first idle period and the second idle period. A specific calculation example of the third fee will be described later.

The privilege granting unit 60 performs a process for granting a privilege to the user when the rental period of the battery BAT is included in a privilege granting target period. For example, the privilege granting target period setting unit 70 sets a period during which the battery BAT is rented relatively infrequently as the privilege granting target period. A specific example of the privilege granting target period will be described later.

Each of function units, that is, each of the input and output unit 10, the first fee calculation unit 20, the second fee calculation unit 30, the rental fee calculation unit 40, the third fee calculation unit 50, the privilege granting unit 60, and the privilege granting target period setting unit 70 can implement a function thereof by the processor of the rental fee calculation device 1 executing a program stored in advance in the storage device such as a hard disk, or by the interface of the rental fee calculation device 1, for example.

The storage unit 80 is implemented by, for example, the storage device such as a hard disk included in the rental fee calculation device 1, and stores an authorized user database (DB) 81, a battery DB 82, a storage apparatus DB 83, the coefficient table 84, and a privilege table 85. These DBs and tables are constructed in advance by an administrator or the like of the rental fee calculation device 1 and can be updated by the rental fee calculation device 1 as appropriate. The storage unit 80 may be provided in a state in which the rental fee calculation device 1 can refer to the storage unit as appropriate, and may be provided inside the rental fee calculation device 1 or provided outside the rental fee calculation device 1.

[Authorized User DB]

As illustrated in FIG. 2, the authorized user database (DB) 81 stores user IDs which represent identification information for identifying each user who has an authority to use the battery BAT of the battery storage apparatus 2. The authorized user DB 81 may store contact details of the user and information indicating a rental limit number which is an upper limit number of batteries BAT which can be rented by the user at the same time or within a predetermined period (for example, one month) and the like in association with each user ID. Accordingly, the rental fee calculation device 1 can output various kinds of information via the input and output unit 10 to the desired contact details stored in the authorized user DB 81, and can limit the number of batteries BAT which can be rented to each user.

[Battery DB]

As illustrated in FIG. 3, the battery DB 82 stores information indicating a current state of each battery BAT in association with the battery ID which identifies each battery BAT. In FIG. 3, for example, the battery ID "B001" is associated with information indicating that the current state is "being rented to U001". This indicates that the battery BAT with the battery ID "B001" is currently being rented to a person with the user ID "U001". On the other hand, the battery ID "B003" is associated with information indicating that the current state is "being housed in first housing space of X001". This indicates that the battery BAT with the battery ID "B003" is currently being housed in the first housing space 21 of the battery storage apparatus 2 with the storage apparatus ID "X001" (that is, not being rented).

[Storage Apparatus DB]

Figure 4:
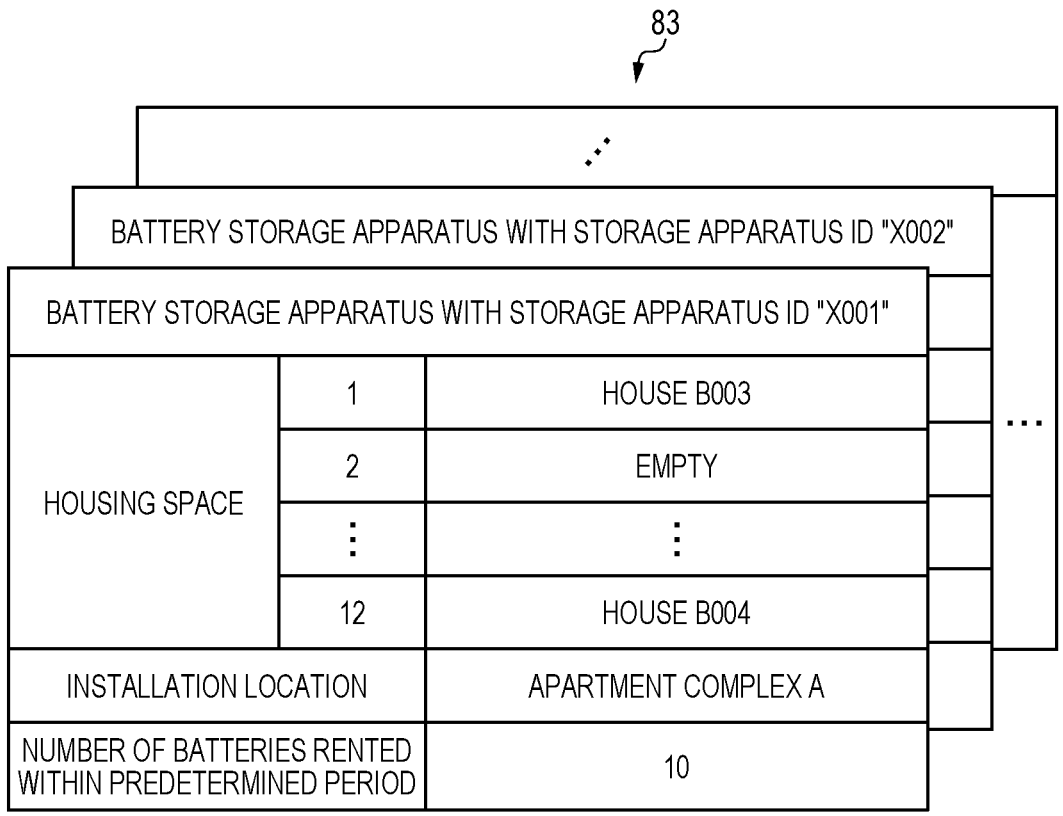
FIG. 4 is a diagram illustrating an example of a storage apparatus DB stored in the storage unit of the rental fee calculation device.

As illustrated in FIG. 4, the storage apparatus DB 83 stores information indicating the current state of each housing space 21 of the battery storage apparatus 2 in association with each battery storage apparatus 2. In an example illustrated in FIG. 4, information indicating that the current state of the first housing space 21 of the battery storage apparatus 2 with the storage apparatus ID "X001" is "being housed in B003" is stored, and the information indicating that the current state of the second housing space 21 is "empty" is stored. The information indicates that the first housing space 21 of the battery storage apparatus 2 with the storage apparatus ID "X001" currently stores the battery BAT with the battery ID "B003", and the second housing space 21 currently does not house any battery BAT.

The storage apparatus DB 83 may further store information on an installation location where each battery storage apparatus 2 is provided and information indicating the number of batteries BAT rented from each battery storage apparatus 2 within a predetermined period.

[Coefficient Table]

The coefficient table 84 stores the first coefficient used to calculate the first fee and the third fee, and the second coefficient used to calculate the second fee. As will be described later, in the present embodiment, the first coefficient is, for example, a usage fee of 100 yen per hour (100 yen/h). The second coefficient is, for example, a usage fee per unit power amount of 1 yen per watt hour (1 yen/Wh).

[Privilege Table]

Figure 5:
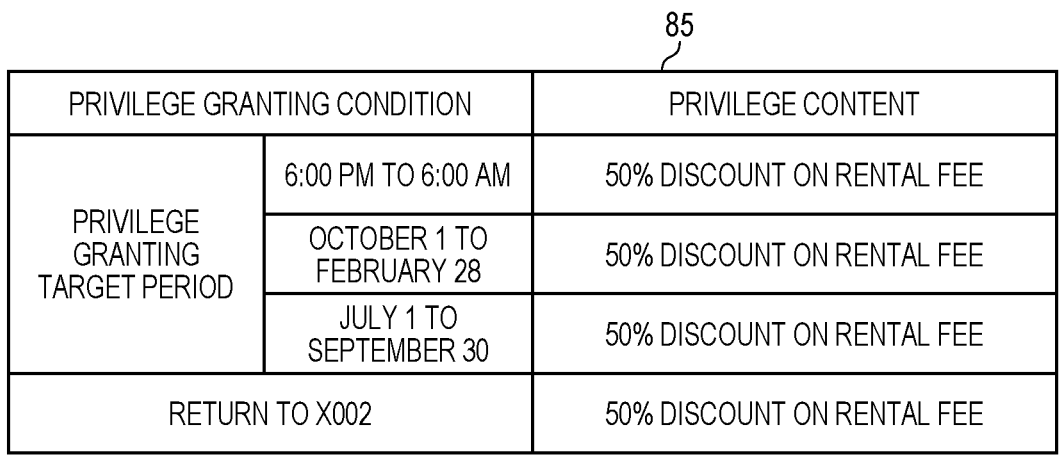
FIG. 5 is a diagram illustrating an example of a privilege table stored in the storage unit of the rental fee calculation device.

As illustrated in FIG. 5, the privilege table 85 stores privilege granting conditions for granting a predetermined privilege to the user and privilege contents to be granted when the privilege granting conditions are satisfied in association with each other. An example of the privilege granting condition is the privilege granting target period. The privilege granting target period is a condition that a privilege is granted to the user who uses the battery BAT during the period.

The period during which the battery BAT is rented relatively infrequently, that is, a period during which the battery BAT is used relatively infrequently is set as the privilege granting target period, and a privilege is granted to the user for use during the privilege granting target period, so that it is possible to improve an operation rate of the battery BAT during the privilege granting target period. Therefore, it is possible to prompt the rental of the battery BAT to be distributed throughout the entire period.

A calculation method of the period during which the battery BAT is rented relatively infrequently may perform a calculation based on a date or time slot when a ratio of the housing space 21 housing the battery BAT to all the housing spaces 21 (first to twelfth) of the battery storage apparatus 2 exceeds a threshold, or a date or time slot when a ratio of the housing space 21 in which the battery BAT is rented to all the housing spaces 21 is below a threshold from information of the storage apparatus DB 83. The privilege granting target period (period during which the battery BAT is rented relatively infrequently) may be calculated for each specific area (that is, the battery storage apparatus 2 provided in the specific area).

In the present embodiment, a period from 6:00 pm to 6:00 am (that is, from nighttime to early morning), a period from October 1 to February 28 (that is, winter), and a period from July 1 to September 30 (that is, summer) are the privilege granting target periods. The privilege content for each privilege granting target period is a 50% discount on the rental fee.

Another example of the privilege granting condition is a return of the battery BAT to the specific battery storage apparatus 2 among the plurality of battery storage apparatuses 2. The plurality of battery storage apparatuses 2 are installed at various places with different conditions. Therefore, a frequency of visits by the user to each battery storage apparatus 2 and the number of rented batteries BAT in each battery storage apparatus 2 are, of course, different for each battery storage apparatus 2. There is a high possibility that the battery storage apparatus 2 frequently visited by the user and with a large number of rented batteries BAT, that is, frequently used, does not have a battery BAT which can be rented. Therefore, it is desirable from a viewpoint of effective utilization of the battery BAT to prompt the user to return the battery BAT to the frequently used battery storage apparatus 2. In the present embodiment, the battery storage apparatus 2 with a storage apparatus ID "X002" is the frequently used battery storage apparatus 2, and the privilege of the 50% discount on the rental fee is granted on the condition that the battery BAT is returned to the battery storage apparatus 2 with the storage apparatus ID "X002".

By prompting the user to return the battery BAT to the battery storage apparatus 2 which is used less frequently than the battery storage apparatus 2 which rents out the battery BAT, the battery BAT can be utilized effectively. In other words, the battery BAT stored in the frequently used battery storage apparatus 2 tends to be charged and discharged more frequently, and thus, the battery BAT tends to deteriorate, and a maximum charge capacity (hereinafter, sometimes referred to as a state of health (SOH)) tends to decrease. Therefore, if the battery BAT rented from the frequently used battery storage apparatus 2 is repeatedly returned to the frequently used battery storage apparatus 2, the deteriorated (low SOH) batteries BAT tend to gather in the frequently used battery storage apparatus 2, and as a result, the frequently used battery storage apparatus 2 has less available batteries BAT (having appropriate SOH). In order to avoid this state, the user is prompted to return the battery BAT to the battery storage apparatus 2 which is used less frequently than the battery storage apparatus 2 which rents out the battery BAT, so that the deteriorated (low SOH) batteries BAT can be prevented from gathering in the frequently used battery storage apparatus 2, and thus, the battery BAT (having an appropriate SOH) which is available in each battery storage apparatus 2 can be easily secured.

Figures 6, 7:
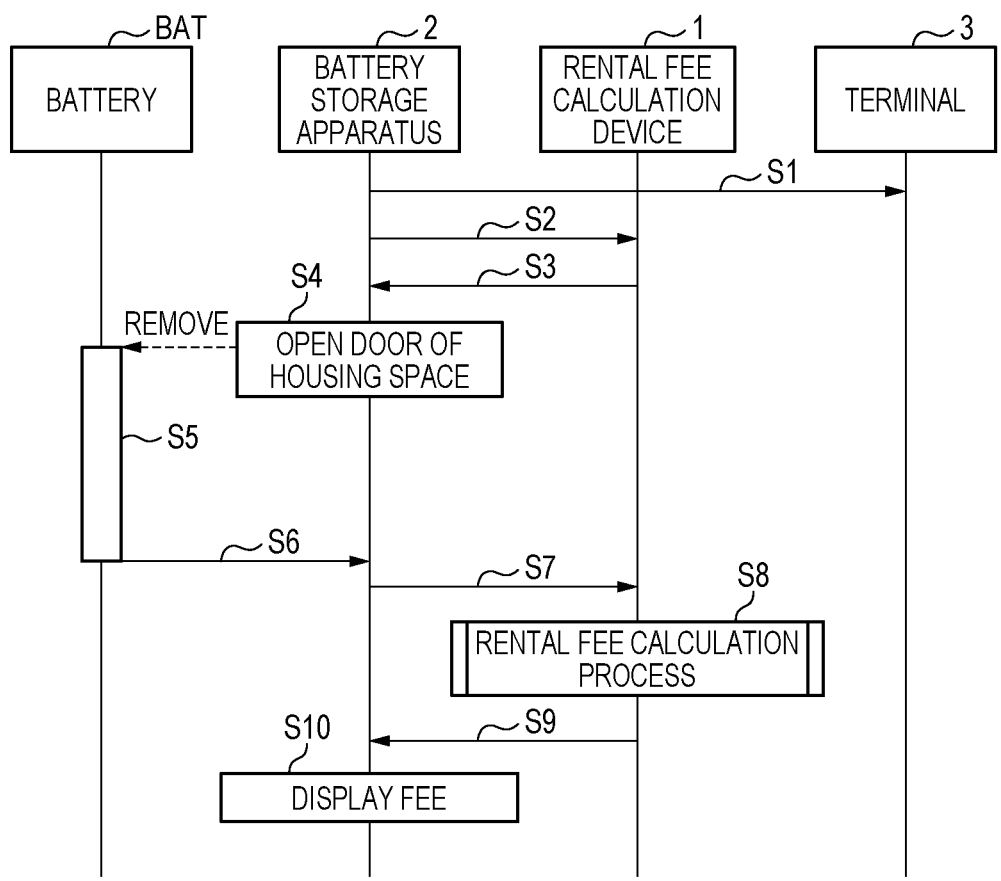
FIG. 6 is a diagram illustrating an example of log information stored by a battery.
FIG. 7 is a sequence diagram illustrating an example of processes performed by devices of the rental fee calculation system

The log information 86 illustrated in FIG. 6 is information stored in the battery IC of the battery BAT, as described above. The log information 86 stores, for example, a date and time and an event which occurs at that date and time in association with each other. The log information 86 represents a usage history of the battery BAT used by the user.

For example, the log information 86 in the example illustrated in FIG. 6 indicates that the rental period of the battery BAT is from 7:00 pm on August 1 to 12:00 pm on August 1. The log information in the present embodiment stores, in time-series, 1) an event that at the date and time of 7:00 pm on August 1, the user removes the battery BAT from the battery storage apparatus 2 with the storage apparatus ID "X001", and the power amount stored in the battery BAT at the time of removal is 1000 Wh, 2) an event that at the date and time of 8:00 pm on August 1, discharging of the battery BAT to the load (for example, any electric device) is started, 3) an event that at the date and time of 10:00 pm on August 1, the discharging of the battery BAT to the load ends, and 4) an event that at the date and time of 12:00 pm on August 1, the user returns the battery BAT to the battery storage apparatus 2 with the storage apparatus ID "X001", and the power amount stored in the battery BAT at the time of the return is 500 Wh. In order to store such log information 86, the battery BAT includes, for example, a real-time clock (RTC), various sensors, a storage device, and the like.

The log information 86 of the example illustrated in FIG. 6 indicates that in the rental period of the battery BAT, a usage period during which the battery BAT is used for driving the load and an idle period during which the battery BAT is not used for driving the load are present. That is, a period from 1) to 2) described above (that is, 1 hour) is the first idle period from when the battery BAT is removed from the battery storage apparatus 2 to when the load is first charged, and a period from 3) to 4) described above (that is, 2 hours) is the second idle period from when the battery BAT is last discharged to the load before being returned to the battery storage apparatus 2 to when the battery BAT is returned to the battery storage apparatus 2. Therefore, a total idle period in this example is 1 hour+2 hours=3 hours. The rental period in this example is 12:00 pm on August 1-7:00 pm on August 1=5 hours. The used power amount in this example is 1000 Wh-500 Wh=500 Wh.

A sequence diagram illustrated in FIG. 7 illustrates an example of processes performed by each of the devices of the battery BAT, the battery storage apparatus 2, the rental fee calculation device 1, and the terminal 3 in the rental fee calculation system 100. When a user who desires to use (rent) the battery BAT (hereinafter, also referred to as the desiring user) holds his/her own terminal 3 over the communication unit 23 provided in the battery storage apparatus 2, communication is performed between the terminal 3 and the communication unit 23, and the battery storage apparatus 2 reads the user ID stored in the terminal 3 (step S1). Here, the desiring user uses the terminal 3 to input the user ID to the battery storage apparatus 2, but the present invention is not limited thereto. For example, an input device such as a touch panel may be provided in the battery storage apparatus 2 in advance, and the desiring user may input the user ID to the battery storage apparatus 2 by operating the input device.

Next, the battery storage apparatus 2 transmits a rental request for the battery BAT (hereinafter, simply referred to as the rental request) including the user ID acquired in step S1 to the rental fee calculation device 1 (step S2).

When the rental fee calculation device 1 receives the rental request from the battery storage apparatus 2, the rental fee calculation device 1 refers to the authorized user DB 81 and determines whether the desiring user is an authorized user based on the user ID included in the received rental request. For example, the rental fee calculation device 1 confirms whether the user IDs stored in the authorized user DB 81 include one matching the user ID included in the received rental request, and then determines whether the desiring user is the authorized user.

Then, when the rental fee calculation device 1 determines that the desiring user is the authorized user, the rental fee calculation device 1 transmits, to the battery storage apparatus 2, rental permission information in which the rental of the battery BAT is permitted (step S3). For example, the rental fee calculation device 1 transmits, to the battery storage apparatus 2, as the rental permission information, an instruction to open the door of the housing space 21 in which the battery BAT to be rented to the desiring user is housed.

The battery storage apparatus 2 opens the door of the housing space 21 according to the received rental permission information. Accordingly, it is possible to remove the battery BAT from the battery storage apparatus 2 (step S4). The battery BAT (specifically, the battery IC) sequentially stores the log information 86 (see FIG. 6) from the time of removal from the battery storage apparatus 2 to the time of the return (step S5). Then, when the battery BAT is returned to the battery storage apparatus 2, the log information 86 stored in step S5 is transmitted to the battery storage apparatus 2 (step S6).

The battery storage apparatus 2 transmits the log information 86 received from the battery BAT to the rental fee calculation device 1 (step S7). The rental fee calculation device 1 executes a rental fee calculation process for calculating the rental fee based on the received log information 86 (step S8). A specific example of the rental fee calculation process will be described later with reference to FIG. 8. The rental fee calculation device 1 transmits the rental fee information based on a process result of the rental fee calculation process to the battery storage apparatus 2 (step S9). The battery storage apparatus 2 displays the rental fee and the like on the display unit 22 of the own device based on the received rental fee information (step S10). A specific display example of the rental fee displayed by the battery storage apparatus 2 will be described later with reference to FIG. 9.

[Example of Rental Fee Calculation Method]

Next, an example of the rental fee calculation process (rental fee calculation method) executed by the rental fee calculation device 1 will be described with reference to FIG. 8. The rental fee calculation program for causing the rental fee calculation device 1 to execute the rental fee calculation process (rental fee calculation method) is stored in advance in the storage device (for example, the storage unit 80) of the rental fee calculation device 1, for example.

Figure 8:
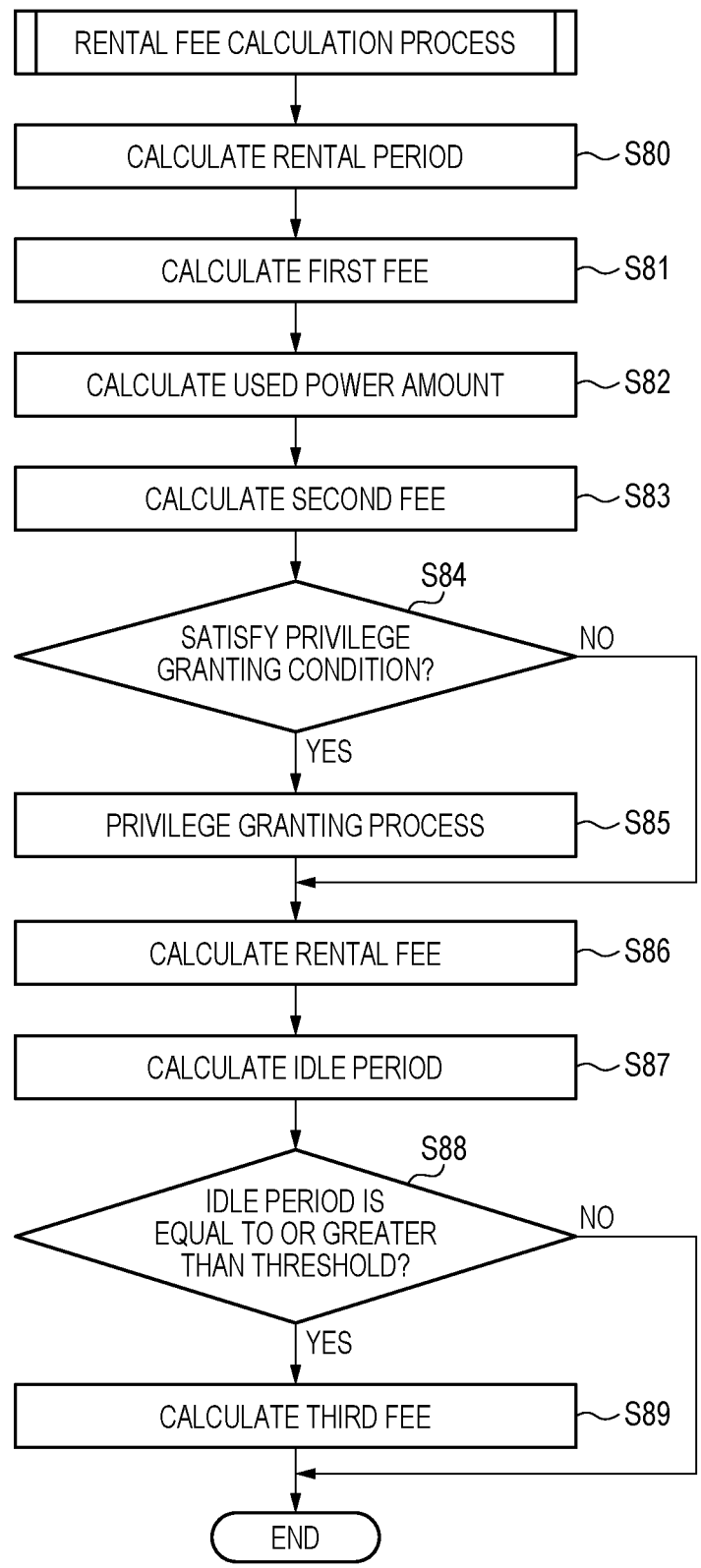
FIG. 8 is a flowchart illustrating an example of a rental fee calculation method.

As illustrated in FIG. 8, first, the rental fee calculation device 1 calculates the rental period from when the battery BAT is removed from the battery storage apparatus 2 to when the battery BAT is returned to the battery storage apparatus based on the log information 86 received from the battery storage apparatus 2 (step S80), and calculates the first fee based on the calculated rental period (step S81). Next, the rental fee calculation device 1 calculates the used power amount discharged by the battery BAT during the rental period based on the received log information 86 (step S82), and calculates the second fee based on the calculated used power amount (step S83).

Then, the rental fee calculation device 1 determines whether the rental of the battery BAT satisfies the privilege granting condition, for example, whether the rental period is included in the privilege granting target period (step S84). When the privilege granting condition is satisfied (step S84, YES), the rental fee calculation device 1 performs a privilege granting process for granting a privilege to the user (step S85).

Next, the rental fee calculation device 1 calculates the rental fee based on the first fee calculated in step S81 and the second fee calculated in step S83 (step S86). For example, the rental fee calculation device 1 calculates the rental fee by adding up the first fee and the second fee. Accordingly, the rental fee can be increased as the rental period is lengthened, and thus, it is possible to prompt the user to return the battery BAT early. When the privilege granting process of step S85 is executed, the rental fee calculation unit 40 may calculate the rental fee to which a discount based on the privilege granting is also applied in step S86.

Next, the rental fee calculation device 1 calculates the idle period during which the battery BAT is not used within the rental period based on the received log information 86 (step S87), and determines whether the calculated idle period is equal to or greater than a threshold (for example, 1 hour) (step S88). When the idle period is equal to or greater than the threshold (step S88; YES), the rental fee calculation device 1 calculates the third fee (step S89). Then, the rental fee calculation device 1 transmits the rental fee information including the information indicating the rental fee and the third fee obtained by the above rental fee calculation process to the battery storage apparatus 2 by the process of step S9 illustrated in FIG. 7.

[Rental Fee Information Display Screen]

FIG. 9 illustrates an example of a rental fee information display screen displayed by the display unit 22 of the battery storage apparatus 2. This display screen is displayed on the display unit 22 by the process of step S10 illustrated in FIG. 7, for example. In the example illustrated in FIG. 9, the display unit 22 displays a message prompting the user to settle the rental fee, and the rental fee of 1000 yen, which is a fee obtained by adding up the fee based on the rental period (first fee): 500 yen (details: 5 h of rental period×100 yen/h) and the fee based on the used power amount (second fee): 500 yen (details: 500 Wh of used power amount×1 yen/Wh).

That is, in the process of step S81 illustrated in FIG. 8, the rental fee calculation device 1 (for example, the first fee calculation unit 20) calculates the first fee by using the first coefficient which is the usage fee per unit time of 100 yen per hour (100 yen/h). In the process of step S83 illustrated in FIG. 8, the rental fee calculation device 1 (for example, the second fee calculation unit 30) calculates the second fee by using the second coefficient which is the usage fee per unit power amount of 1 yen per watt hour (0 yen/Wh).

That is, in the rental fee calculation device 1, the first coefficient used to calculate the first fee and the second coefficient used to calculate the second fee are different. Accordingly, the rental period and the used power amount can be individually weighted and reflected in the rental fee. Therefore, it is possible to reflect the rental period and the used power amount in the rental fee in an appropriate balance, and to set a rental fee which is highly acceptable to the user.

The display unit 22 also displays a message that there is an idle period of 3 hours (3 h) during the rental period and the rental fee includes a fee of 300 yen based on this idle period. The idle period of 3 hours is a total time of the first idle period (1 hour) and the second idle period (2 hours) described in FIG. 6, and the rental fee calculation device 1 (for example, the third fee calculation unit 50) multiplies the 3 hours by the above-described first coefficient (100 yen/h) to calculate the fee of 300 yen (that is, the third fee) based on the idle period.

That is, in steps S87 to S89 illustrated in FIG. 8, the rental fee calculation device 1 (for example, the third fee calculation unit 50) calculates the third fee based on at least one idle period of the first idle period from when the battery BAT is removed from the battery storage apparatus 2 to when the load is first charged, and the second idle period from when the load is last charged before the battery BAT is returned to the battery storage apparatus 2 to when the battery BAT is returned to the battery storage apparatus 2. Accordingly, the rental fee calculation device 1 can output the third fee information indicating the third fee based on the idle period during which the rented battery BAT is not used, and thus, it is possible to inform the user of the third fee. By knowing the third fee based on the idle period, the user can expect to try to shorten the rental time from a next time, and thus, it is possible to improve the operation rate of the battery BAT.

The rental fee calculation device 1 (for example, the third fee calculation unit 50) may calculate the third fee when the idle period is equal to or greater than the threshold. Accordingly, the third fee can be calculated only when the idle period is equal to or greater than the threshold, so that the user can be informed of the third fee only when the idle period is long. The rental fee calculation device 1 (for example, the third fee calculation unit 50) may calculate the third fee regardless of the length of the idle period and may cause the battery storage apparatus 2 to display the third fee only when the calculated third fee is equal to or greater than the threshold. Accordingly, it is possible to inform the user of the third fee only when the third fee is relatively high.

As illustrated in FIG. 1, the rental fee calculation device 1 manages and controls the plurality of battery storage apparatuses 2. That is, the battery storage apparatuses 2 include a first battery storage apparatus and a second battery storage apparatus, each of which is configured to allow the battery BAT to be attached and detached.

In this case, the rental fee calculation device 1 (for example, the privilege granting unit 60) may perform the process for granting the privilege when the battery BAT removed from the first battery storage apparatus is returned to the second battery storage apparatus. Here, the second battery storage apparatus is any one of the battery storage apparatus 2 installed in a different area from the first battery storage apparatus, the battery storage apparatus 2 having a relatively higher frequency of renting the battery BAT (usage frequency) than the first battery storage apparatus, and the battery storage apparatus 2 having a relatively lower frequency of renting the battery BAT than the first battery storage apparatus.

In the above configuration, the privilege can be granted to the user when the battery BAT removed from the first battery storage apparatus is returned to any one of the second battery storage apparatus installed in the different area from the first battery storage apparatus, the second battery storage apparatus having a relatively higher frequency of renting the battery BAT than the first battery storage apparatus, and the second battery storage apparatus having a relatively lower frequency of renting the battery BAT than the first battery storage apparatus. Accordingly, the user is prompted to bring the battery BAT used by the user into another area, the battery storage apparatus 2 in which the battery BAT is frequently rented, or the battery storage apparatus 2 in which the battery is rented infrequently by the user him/herself, so that it is possible to effectively utilize the battery BAT of the rental fee calculation system 100 while reducing a labor of bringing the battery BAT by a manager who manages the rental fee calculation device 1 and the battery storage apparatus 2.

As described above, an aspect for carrying out the present invention has been described using the embodiment, but the present invention is by no means limited to such an embodiment, and various modifications and replacements can be made without departing from the gist of the present invention.

For example, in the above-described embodiment, it is assumed that there are a plurality of battery storage apparatuses 2, but there may be only one battery storage apparatus 2.

In the present specification, at least the following matters are described. Although corresponding constituent elements or the like in the above-described embodiment are shown in parentheses, the present invention is not limited thereto.

(1) A rental fee calculation device (rental fee calculation device 1) for calculating a rental fee for renting a battery (battery BAT) to be rented when the battery is rented to a user via a battery storage apparatus (battery storage apparatus 2) configured to allow the battery to be attached and detached, the rental fee calculation device including:

a first fee calculation unit (first fee calculation unit 20) configured to calculate a first fee based on a rental period from when the battery is removed from the battery storage apparatus to when the battery is returned to the battery storage apparatus;

a second fee calculation unit (second fee calculation unit 30) configured to calculate a second fee based on a used power amount discharged by the battery during the rental period;

a rental fee calculation unit (rental fee calculation unit 40) configured to calculate the rental fee based on the first fee calculated by the first fee calculation unit and the second fee calculated by the second fee calculation unit; and an output unit (input and output unit 10) configured to output rental fee information indicating the rental fee calculated by the rental fee calculation unit.

According to (1), the rental fee of the battery can be calculated on a basis of the first fee based on the rental period and the second fee based on the used power amount. Accordingly, the rental fee can reflect a length of the rental period, and the user can be prompted to return the battery early. Therefore, it is possible to prevent a situation in which another user cannot use the battery because the user does not return the battery for a long period of time from occurring, and it is possible to cause many users to use the battery efficiently and improve an operation rate of the battery.

(2) The rental fee calculation device according to (1), in which the rental fee calculation unit calculates the rental fee by adding up the first fee and the second fee.

According to (2), the fee obtained by adding up the first fee and the second fee can be calculated as the rental fee. Accordingly, the rental fee can be increased as the rental period is lengthened, and thus, it is possible to prompt the user to return the battery early.

(3) The rental fee calculation device according to (1) or (2), in which a first coefficient used by the first fee calculation unit to calculate the first fee and a second coefficient used by the second fee calculation unit to calculate the second fee are different.

According to (3), the first coefficient used by the first fee calculation unit to calculate the first fee and the second coefficient used by the second fee calculation unit to calculate the second fee are different. Accordingly, the rental period and the used power amount can be individually weighted and reflected in the rental fee. Therefore, it is possible to reflect the rental period and the used power amount in the rental fee in an appropriate balance, and to set a rental fee which is highly acceptable to the user.

(4) The rental fee calculation device according to any one of (1) to (3), further including:

a privilege granting unit (privilege granting unit 60) configured to perform a process for granting the privilege to the user when the rental period is included in a privilege granting target period.

According to (4), when the rental period is included in the privilege granting target period, the privilege can be granted to the user. Accordingly, it is possible to improve the operation rate of the battery in the privilege granting target period.

(5) The rental fee calculation device according to (4), further including:

a privilege granting target period setting unit (privilege granting target period setting unit 70) configured to set a period during which the battery is rented relatively infrequently as the privilege granting target period.

According to (5), the period during which the battery is rented relatively infrequently can be set as the privilege granting target period. Accordingly, it is possible to improve the operation rate of the battery in the period during which the battery is rented relatively infrequently. Therefore, it is possible to prompt the rental of the battery to be distributed throughout the entire period.

(6) The rental fee calculation device according to any one of (1) to (5), further including:

a third fee calculation unit (third fee calculation unit 50) configured to calculate a third fee based on at least one idle period of a first idle period from when the battery is removed from the battery storage apparatus to when a load is first charged, and a second idle period from when the load is last charged before the battery is returned to the battery storage apparatus to when the battery is returned to the battery storage apparatus, in which the output unit is configured to further output third fee information indicating the third fee calculated by the third fee calculation unit.

According to (6), the third fee information indicating the third fee based on the idle period during which the rented battery is not used can be output, and thus, it is possible to inform the user of the third fee.

(7) The rental fee calculation device according to (6), in which the third fee calculation unit is configured to calculate the third fee when the idle period is equal to or greater than a threshold.

According to (7), the third fee can be calculated when the idle period is equal to or greater than the threshold, so that the user with a long idle period can be informed of the third fee.

(8) The rental fee calculation device according to any one of (1) to (7), in which:

the battery storage apparatus includes a first battery storage apparatus and a second battery storage apparatus, each configured to allow the battery to be attached and detached;

a privilege granting unit configured to perform a process for granting a privilege when the battery removed from the first battery storage apparatus is returned to the second battery storage apparatus is further provided; and the second battery storage apparatus is any one of a battery storage apparatus installed in a region different from the first battery storage apparatus, a battery storage apparatus having a relatively higher frequency of renting the battery than the first battery storage apparatus, and a battery storage apparatus in which the battery is rented relatively infrequently than the first battery storage apparatus.

According to (8), the privilege can be granted to the user when the battery removed from the first battery storage apparatus is returned to any one of the second battery storage apparatus installed in the different area from the first battery storage apparatus, the second battery storage apparatus having a relatively higher frequency of renting the battery than the first battery storage apparatus, and the second battery storage apparatus having a relatively lower frequency of renting the battery than the first battery storage apparatus. Accordingly, the user is prompted to bring the battery used by the user into another area, the battery storage apparatus in which the battery is frequently rented, or the battery storage apparatus in which the battery is rented infrequently by the user him/herself, so that it is possible to effectively utilize the battery while reducing a labor of bringing the battery by a manager who manages the rental fee calculation device and the battery storage apparatus.

(9) A rental fee calculation method, in which:
a computer (rental fee calculation device 1) configured to calculate a rental fee for renting a battery (battery BAT) to be rented when the battery is rented to a user via a battery storage apparatus configured to allow the battery to be attached and detached is configured to execute processes of:
calculating a first fee based on a rental period from when the battery is removed from the battery storage apparatus to when the battery is returned to the battery storage apparatus (step S81);
calculating a second fee based on a used power amount discharged by the battery during the rental period (step S83);
calculating the rental fee based on the first fee and the second fee which are calculated (step S86); and
outputting rental fee information indicating the rental fee which is calculated (step S9).

According to (9), the rental fee of the battery can be calculated on a basis of the first fee based on the rental period and the second fee based on the used power amount. Accordingly, not only the rental period but also the used power amount can be reflected in the rental fee, and the user can be prompted to return the battery early. Therefore, it is possible to prevent a situation in which another user cannot use the battery because the user does not return the battery for a long period of time from occurring, and it is possible to cause many users to use the battery efficiently and improve an operation rate of the battery.

(10) A rental fee calculation program for causing a computer (rental fee calculation device 1) configured to calculate a rental fee for renting a battery (battery BAT) to be rented when the battery is rented to a user via a battery storage apparatus configured to allow the battery to be attached and detached to execute processes of:
calculating a first fee based on a rental period from when the battery is removed from the battery storage apparatus to when the battery is returned to the battery storage apparatus (step S81);
calculating a second fee based on a used power amount discharged by the battery during the rental period (step S83);
calculating the rental fee based on the first fee and the second fee which are calculated (step S86); and
outputting rental fee information indicating the rental fee which is calculated (step S9).

According to (10), the rental fee of the battery can be calculated on a basis of the first fee based on the rental period and the second fee based on the used power amount. Accordingly, not only the rental period but also the used power amount can be reflected in the rental fee, and the user can be prompted to return the battery early. Therefore, it is possible to prevent a situation in which another user cannot use the battery because the user does not return the battery for a long period of time from occurring, and it is possible to cause many users to use the battery efficiently and improve an operation rate of the battery.

REFERENCE SIGNS LIST 1 rental fee calculation device
2 battery storage apparatus
10 input and output unit
20 first fee calculation unit
30 second fee calculation unit
40 rental fee calculation unit
50 third fee calculation unit
60 privilege granting unit
70 privilege granting target period setting unit
80 storage unit

What is claimed is:

1. A rental fee calculation device for calculating a rental fee for renting a battery to be rented when the battery is rented to a user via a battery storage apparatus configured to allow the battery to be attached to and detached from, the rental fee calculation device comprising:
a first fee calculation unit configured to calculate a first fee based on a rental period from when the battery is detached from the battery storage apparatus to when the battery is returned to the battery storage apparatus;
a second fee calculation unit configured to calculate a second fee based on a used power amount discharged by the battery during the rental period;
a rental fee calculation unit configured to calculate the rental fee based on the first fee calculated by the first fee calculation unit and the second fee calculated by the second fee calculation unit;
an output unit configured to output rental fee information indicating the rental fee calculated by the rental fee calculation unit; and
a third fee calculation unit configured to calculate a third fee based on at least one idle period of a first idle period from when the battery is detached from the battery storage apparatus to when the battery is first discharged to a load, and a second idle period from when the battery is last discharged to the load before the battery is returned to the battery storage apparatus to when the battery is returned to the battery storage apparatus, wherein
the output unit is configured to further output third fee information indicating the third fee calculated by the third fee calculation unit,
the rental fee calculation unit is further configured to
receive a rental request from the battery storage apparatus,
determine whether the user is an authorized user based on the received rental request, and
in response to a determination that the user is the authorized user, cause a component of the battery storage apparatus to enable the battery to be detached from the battery storage apparatus, and
the first fee calculation unit, the second fee calculation unit, the rental fee calculation unit, the output unit, and the third fee calculation unit are each implemented via at least one processor.

2. The rental fee calculation device according to claim 1, wherein
the rental fee calculation unit calculates the rental fee by adding up the first fee and the second fee.

3. The rental fee calculation device according to claim 1, wherein
a first coefficient used by the first fee calculation unit to calculate the first fee and a second coefficient used by the second fee calculation unit to calculate the second fee are different.

4. The rental fee calculation device according to claim 1, further comprising:
a privilege granting unit configured to perform a process for granting a privilege to the user when the rental period is included in a privilege granting target period, wherein the privilege granting unit is implemented via at least one processor.

5. The rental fee calculation device according to claim 4, further comprising:
a privilege granting target period setting unit configured to set a period during which the battery is rented relatively infrequently as the privilege granting target period,
wherein the privilege granting target period setting unit is implemented via at least one processor.

6. The rental fee calculation device according to claim 1, wherein
the third fee calculation unit is configured to calculate the third fee when the idle period is equal to or greater than a threshold.

7. The rental fee calculation device according to claim 1, wherein:
the battery storage apparatus includes a first battery storage apparatus and a second battery storage apparatus, each configured to allow the battery to be attached and detached;
a privilege granting unit configured to perform a process for granting a privilege to the user when the battery detached from the first battery storage apparatus is returned to the second battery storage apparatus is further provided; the second battery storage apparatus is any one of a battery storage apparatus installed in a region different from the first battery storage apparatus, a battery storage apparatus having a relatively higher frequency of renting the battery than the first battery storage apparatus, and a battery storage apparatus having a relatively lower frequency of renting the battery than the first battery storage device; and
wherein the privilege granting unit is implemented via at least one processor.

8. A rental fee calculation method, wherein:
a computer configured to calculate a rental fee for renting a battery to be rented when the battery is rented to a user via a battery storage apparatus configured to allow the battery to be attached to and detached from is configured to execute processes of:
calculating a first fee based on a rental period from when the battery is detached from the battery storage apparatus to when the battery is returned to the battery storage apparatus;
calculating a second fee based on a used power amount discharged by the battery during the rental period;
calculating the rental fee based on the first fee and the second fee which are calculated;
outputting rental fee information indicating the rental fee which is calculated;
calculating a third fee based on at least one idle period of a first idle period from when the battery is detached from the battery storage apparatus to when the battery is first discharged to a load, and a second idle period from when the battery is last discharged to the load before the battery is returned to the battery storage apparatus to when the battery is returned to the battery storage apparatus;
outputting third fee information indicating the third fee which is calculated;
receiving a rental request from the battery storage apparatus;
determining whether the user is an authorized user based on the received rental request; and
in response to a determination that the user is the authorized user, causing a component of the battery storage apparatus to enable the battery to be detached from the battery storage apparatus.

9. A non-transitory computer-readable storage medium storing a rental fee calculation program for causing a computer configured to calculate a rental fee for renting a battery to be rented when the battery is rented to a user via a battery storage apparatus configured to allow the battery to be attached to and detached from to execute processes of:
calculating a first fee based on a rental period from when the battery is detached from the battery storage apparatus to when the battery is returned to the battery storage apparatus;
calculating a second fee based on a used power amount discharged by the battery during the rental period;
calculating the rental fee based on the first fee and the second fee which are calculated;
outputting rental fee information indicating the rental fee which is calculated;
calculating a third fee based on at least one idle period of a first idle period from when the battery is detached from the battery storage apparatus to when the battery is first discharged to a load, and a second idle period from when the battery is last discharged to the load before the battery is returned to the battery storage apparatus to when the battery is returned to the battery storage apparatus;
outputting third fee information indicating the third fee which is calculated;
receiving a rental request from the battery storage apparatus;
determining whether the user is an authorized user based on the received rental request; and
in response to a determination that the user is the authorized user, causing a component of the battery storage apparatus to enable the battery to be detached from the battery storage apparatus.

* * * * *